Nov. 13, 1934.    E. M. ROSENFIELD    1,980,831
ELECTRIC SWITCH OR JUNCTION BOX
Filed April 23, 1932
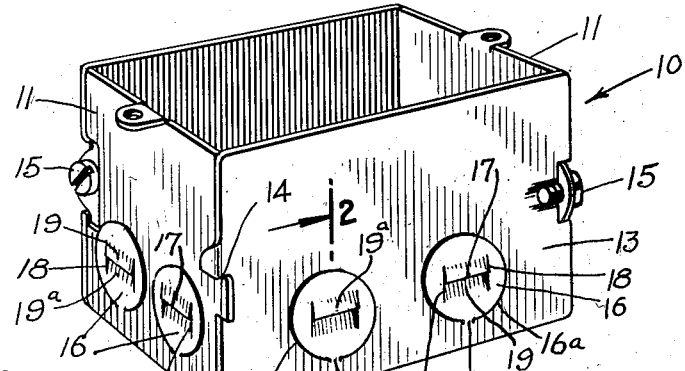
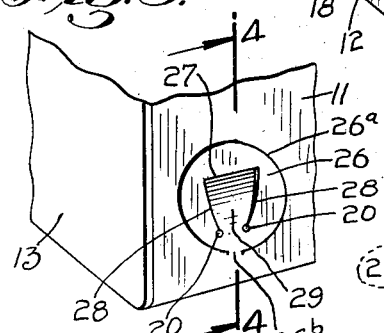
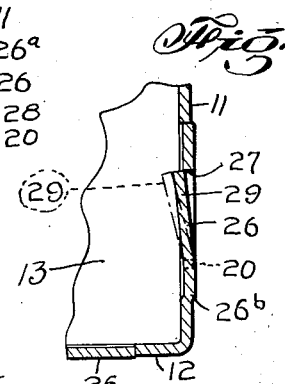
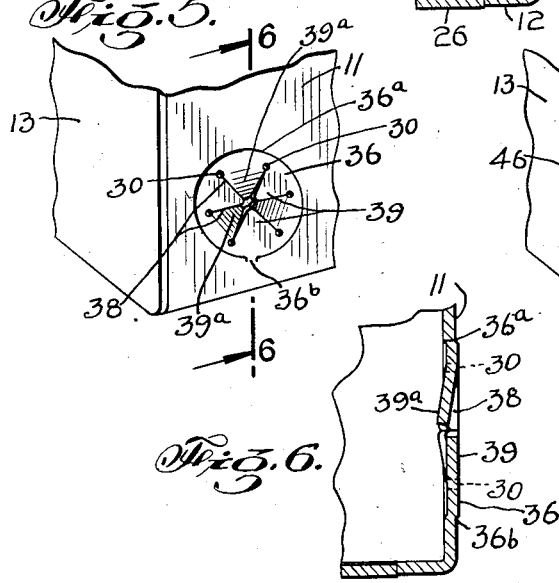
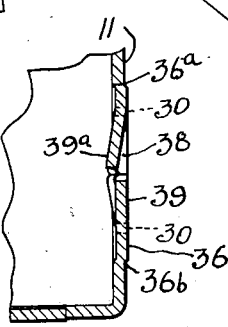
INVENTOR
Edward M. Rosenfield
BY Louis Barnett
ATTORNEY Patented Nov. 13, 1934

1,980,831

UNITED STATES PATENT OFFICE 1,980,831

ELECTRIC SWITCH OR JUNCTION BOX

Edward M. Rosenfield, New York, N. Y., assignor to Standard Electric Equipment Corporation, a corporation of Delaware Application April 23, 1932, Serial No. 607,046

5 Claims. (Cl. 247—26)

This invention relates to "knock-outs" for a sheet metal electric switch or junction box and particularly is directed to an improved pry-out type of "knock-out" construction.

Among the objects of this invention is to generally improve the construction of "knock-outs" for electric junction boxes, which shall be dislodged and readily removed by prying from the exterior side of the box thereby eliminating interference with the cable clamping devices or wiring connections within the box, which shall be simple in construction, cheap to manufacture, and practical and efficient to a high degree in use.

Other objects of this invention will in part be obvious and in part hereinafter pointed out.

The invention accordingly consists in the features of construction, combination of elements and arrangement of parts which will be exemplified in the constructions hereinafter described and of which the scope of the application will be indicated in the following claims.

In the accompanying drawing, in which is shown various possible illustrative embodiments of the invention.

Fig. 1 is a perspective view of an electric switch or junction box formed with one construction of "knock-outs" embodying the invention.

Fig. 2 is a fragmentary cross-sectional view taken on lines 2—2 in Fig. 1.

Figs. 3, 5 and 7 are fragmentary perspective views showing parts of a switch box formed with modified constructions of "knock-outs" embodying the invention.

Figs. 4, 6 and 8 are cross-sectional views taken on lines 4—4 in Fig. 3, lines 6—6 in Fig. 5, and lines 8—8 in Fig. 7, respectively.

Referring in detail to the drawing, 10 denotes a junction box of conventional construction assembled of steel stamped parts having end walls 11, usually formed integral with the bottom side 12 of the box, and detachable side wall plates 13. The latter are retained in position with a suitable interlocking connection 14 and screw-fastening 15 in the well understood manner, and as shown in Fig. 1.

The box 10 is provided with "knock-outs" 16 in the end walls 11, the bottom side 12 and the side plates 13. These "knock-outs" 16 may be of any desired shape, preferably being circular and of a diameter to permit when removed the free passage of standard size of electric conduit or armored cables (not shown). The "knock-out" 16 may be formed in any well understood manner by a punch and die. The metal of the walls or sides of the box 10 is severed along broken lines 16a to form the peripheries of the "knock-outs" 16 to leave unsevered portions 16b between the ends of each line for retaining the "knock-outs" 16 in position as removable closures for the openings 16c or in the walls 11, side 12, or plates 13 wherethrough the conduit or cables pass.

As shown in Figs. 1 and 2, "knock-outs" 16, each has a sheared mid-portion 17 extending between two spaced slits 18 forming an H cut and two abutting upper and lower U-shaped sections 19a and 19, respectively. Either of the said sections 19 or 19a may be displaced slightly inwardly or outwardly with respect to the plane of the box wall 11 to facilitate the operation of inserting a prying tool T in the manner hereinafter described. Preferably the edges of the sections 19 and 19a formed by the sheared portions 17 are retained in contact so as to avoid leaving direct passages through the walls 11, bottom sides 12 and plates 13 of the box since such passages are considered objectionable because they provide communication between the interior and exterior of the box which may become a fire hazard in case of defective wiring installation or arcing of switch parts installed in the box.

Since these "knock-outs" 16 are positioned in close proximity to cable clamping means, switch parts and wiring connections usually housed inside the box 10 (not shown), it is frequently found inconvenient, if not practically impossible, to dislodge a "knock-out" for clearing the opening 16c prior to insertion of a conduit or cable by forcing the "knock-out" into the box. In such cases the "knock-out" 16 above described and shown in Figs. 1 and 2 can be readily removed from the exterior side of the box without interference with the cable clamping means, switch parts or wiring connections within the box. This is readily accomplished by forcing the blade end of a screw-driver or similar tool T into the sheared portion 17 for separating the sections 19 and 19a to provide an opening, as for example as shown in Fig. 2 after the section 19 is bent to dot and dash line position. The "knock-out" 16 can then be readily pried outwardly from the opening 16c. The spaced slits 18 are of sufficient length to form the U-shaped sections 19 and 19a into resilient or yieldable structures. When the "knock-out" 16 is bent out sufficiently from the plane of the wall 11, the unsevered portion 16b which connects and retains the "knock-out" 16 in position breaks off at 16b permitting the removal of the latter. The sheared and slitted construction of the mid-portions in the "knock-outs" 16 are practically closed normally but can be readily forced open for receiving the blade of the screw-driver T in the manner described above and shown in Fig. 2.

It will be readily understood that a single U-shaped bendable section can be used instead of the double U-shaped sections 19 and 19a provided by the H shaped cut shown in Figs. 1 and 2.

To this end, as shown in Figs. 3 and 4, another embodiment of the invention is provided. As here shown the "knock-out" 26 is circular in shape and has a single inverted U-shaped slitted section 29, the ends of which may if desired terminate in small perforations 20, adjacent the unsevered portions 26b. The latter is spaced between the ends of the broken lines 26a forming the periphery of the "knockout" 26. To remove the latter, the section 29 is displaced by bending from its normal closure position shown in full lines in Fig. 4 to the dotted line position, by forcing the blade of the tool T into the sheared portion 27 in the same manner described above for the "knock-out" 16 and shown in Fig. 2. The section 29 is relatively long and the spaced slits 28 may be converged so as to form said section 29 into a relatively resilient, yieldable structure. As in the "knock-out" 16 construction described above and shown in Figs. 1 and 2, the "knock-out" 26 can be removed by outwardly prying in the same manner after the tool T has been inserted.

In Figs. 5 and 7 star and cross-shaped sheared and slitted mid-portion constructions are shown in "knock-outs" 36 and 46, respectively, embodying the invention. In the "knock-out" 36 which is formed by the broken line 36a having the unsevered portion 36b, the slits 38 may each terminate in perforations 30 so as to form triangular shaped sectors 39. The alternate sectors 39a being slightly depressed with relation to the normal plane of the "knock-out" 36 as is clearly shown in Fig. 6 to facilitate forcing an entry of the blade of a tool T in slits 38 in the manner described above for the "knock-outs" 16 and 26 constructions described above and shown in Figs. 2 and 3.

The cross-shaped sheared and slotted mid-portion construction shown in the "knock-out" 46 is formed by the broken line 46a having the unsevered portion 46b and slits 48, each terminating in perforations 40 so as to form oppositely positioned triangular shaped sectors 49. The alternate sectors 49a are slightly depressed with relation to the normal plane of the "knock-out" 46 as is clearly shown in Fig. 8 to facilitate forcing an entry of the blade of a tool T in the manner described above for the "knock-outs" shown in Figs. 2, 4 and 6. The bendable sectors 49a are preferably made relatively smaller than the undepressed mid-portion section of the "knock-out" 49 so as to provide more resilient structures.

It will now be apparent that the "knock-outs" 36 and 46 can be removed by a prying operation in the same manner described above for the "knock-outs" 16 and 26, the star and cross shaped sheared and slitted mid-portion constructions serving the same purposes as the U-shaped sectors shown in Figs. 1 and 3, but in the case of the "knock-outs" 36 and 46, the prying movement with the blade of the screw-driver can be selectively accomplished in a plurality of directions. This latter is desirable because sometimes the junction or switch box 10 is installed so that no space is available for swinging the screw-driver in one direction for prying. In such cases the screw-driver can be selectively entered into one of the slots provided the star or cross shaped construction for prying in another direction thus giving the workman greater latitude for applying the prying operation.

In the constructions shown in Figs. 3, 5 and 7 the perforations 20, 30 and 40 in each case render the bendable sectors more resilient and facilitate the displacement of the sectors on forcing the blade of the tool T into a prying position. It should be noted that normally the "knock-outs" 16, 26, 36 and 46 form practically tight closures although they have sheared and slitted mid-portions.

It is to be understood that in installations where the fire-underwriters and electric inspectors permit through openings in the "knock-outs", the sections 19 and 19a of "knock-out" 16, section 29 of "knock-out" 26, sections 39a of "knock-out" 36 and sections 49a of "knock-out" 46 may be provided to the trade bent sufficiently to permit the insertion of the blade of the screw-driver without requiring the forced entry thereof described above.

It is thus seen that there is provided improved means whereby the objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A one-piece "knock-out" construction for an electric switch box having a shear and intersecting cuts normally forming a closure to provide a forcibly displaceable resilient section for permitting entry of a prying tool, said shear extending across the center of the knock-out, the ends of said shear terminating short of the boundary of the disc.

2. A "knock-out" construction for boxes of the character described, comprising a one-piece disc having a shear across a portion thereof, the extremities of said shear terminating short of the boundary of the disc, said disc also having spaced cuts therethrough intersecting with said shear to provide a weakened section for facilitating the bending of the disc portions between the cuts out of the plane of the "knock-out."

3. A "knock-out" construction for an electric junction box comprising a one-piece disc having an H-shaped cut extending through the center thereof, and forming U-shaped sections adapted to receive a prying means therebetween.

4. A "knock-out" construction for an electric switch box comprising a one-piece disc having an H-shaped shear in its mid-portion, the extremities of said shear terminating short of the boundary of said disc, said shear forming abutting U-shaped resilient sectors, said sectors being positioned in non-alignment planes and normally providing a closure, one of the sectors being forcibly displaceable on insertion of a prying means in said shear.

5. A "knock-out" construction for boxes of the character described, comprising a one-piece disc having intersecting shears extending across the center thereof to form a series of sections, the extremities of each of said shears terminating short of the boundary of the disc, alternate sections of said series being bent out of the plane of the disc sufficiently to facilitate forcing an entry of a prying tool between adjacent sections.

EDWARD M. ROSENFIELD.